April 22, 1969 M. B. SAMPSON 3,439,925
HYDRAULIC CYLINDER
Filed June 28, 1965 Sheet 1 of 3

INVENTOR.
MERRITT B. SAMPSON
BY Watts & Fisher, attys.

INVENTOR.
MERRITT B. SAMPSON
BY Watts & Fisher, attys.

April 22, 1969 M. B. SAMPSON 3,439,925
HYDRAULIC CYLINDER

Filed June 28, 1965 Sheet 3 of 3

INVENTOR.
MERRITT B. SAMPSON
BY Watts & Fisher, attys.

3,439,925
HYDRAULIC CYLINDER
Merritt B. Sampson, Shaker Heights, Ohio, assignor to
The S-P Manufacturing Corporation
Filed June 28, 1965, Ser. No. 467,346
Int. Cl. B23b *31/30, 31/10, 5/22*
U.S. Cl. 279—4         17 Claims

ABSTRACT OF THE DISCLOSURE

A rotary hydraulic cylinder with a reciprocable piston for actuating a rotary work holder and a stationary distributor for supplying fluid to the cylinder. The distributor includes a pressure lubricated bearing surface with cavities to provide fluid support, annular grooves to supply fluid to the actuator and collection grooves to inhibit fluid leakage.

---

This invention relates to a rotary hydraulic cylinder, particularly to a horizontal rotary hydraulic cylinder for actuating a rotary work holder of a machine tool.

Certain types of machine tools, such as lathes, utilize a rotary hydraulic cylinder to actuate a rotating, work-clamping, chuck or collet. A common arrangement is to mount a work holding chuck on one end of a driven, rotary spindle that is supported in the housing of a machine tool. Conventionally, each end of the spindle extends from the housing. A work holding chuck is mounted on one end of the spindle and a hydraulic cylinder containing an axially movable piston is attached to the other end. Both the chuck and the cylinder rotate with the spindle. The movable piston of the hydraulic cylinder is connected by an actuator tube extending through the spindle to a draw cam or collet of the work holding chuck. Fluid introduced into the rotary cylinder moves the piston and the connected actuator tube in an axial direction relative to the spindle to actuate the work clamping member to hold or release the work. Fluid from a source external to the hydraulic cylinder under pressure is supplied to the cylinder as it rotates with the spindle and work holder, to move and hold the piston in one of two terminal positions.

It will be apparent that it is advantageous to utilize as large a piston as possible to obtain maximum power for holding the work with a given fluid pressure. In many instances, however, the construction of the machine tool with which the hydraulic cyinder is used imposes limitations on the diameter of the cylinder. As a result, stationary cylinders have been used in the past to obtain high clamping pressures. These cylinders were generally fastened by brackets at a location remote from the rotary spindle to avoid the space limitations imposed by the design of the machine tool, and were linked to the actuator tube by a lever and slip ring arrangement. It will be readily apparent that the need for mounting brackets and the use of exposed linkages and slip rings are disadvantageous.

The present invention is directed to an improved rotary hydraulic cylinder and hydraulic fluid distributor that can be mounted directly to the spindle of a machine tool while providing a relatively large piston area in proportion to the overall hydraulic cylinder and distributor diameter. Basically, this is accomplished through an improved fluid bearing and fluid seal design that not only eliminates the need for roller bearings between the rotary cylinder and fixed distributor, and the accompanying wear, but also utilizes the distributor wall as the outer housing of the rotary hydraulic cylinder, effecting a substantial reduction in overall size.

In accordance with this invention, fluid under pressure for operating the movable piston of the hydraulic cylinder is supplied to the rotary cylinder through a stationary distributor in the form of a circular bearing that surrounds a portion of the cylinder. Fluid supplied under pressure to the distributor provides a fluid support between the stationary distributor and the rotating hydraulic cylinder. The fluid supplied to the distributor is also communicated through annular rings in the distributor and conduits in the hydraulic cylinder to the cylinder chamber. Thus, at the same time the piston is actuated and biased toward one terminal position, fluid is also supplied under pressure to support the distributor relative to the hydraulic cylinder. To release the work from the work holder, fluid under pressure is supplied to the opposite end of the cylinder chamber. At the same time, fluid support is maintained between the stationary distributor and the rotating hydraulic cylinder by means of an improved distributor construction.

Briefly, fluid under pressure is supplied to the distributor in which the cylinder rotates through spaced fluid pressure zones. Preferably, the zones are arranged in at least two axially spaced groups of a plurality of circumferentially spaced cavities. The cavities of the groups are axially aligned with each other in sets along the inside, bearing surface of the distributor wall. To bias the piston in one direction, fluid is supplied from a common source to spaced pressure zones of the distributor wall and to one end of the piston chamber. The fluid is supplied only to alternate sets of pressure zones spaced about the bearing surface. At the same time, the remaining alternate sets of cavities and the opposite end of the fluid cylinder are connected with an exhaust port. When the fluid pressure is reversed to bias the piston in the opposite direction, the distributor is supported by the alternate sets of cavities previously connected to an exhaust port. Thus, regardless of the direction in which the piston of the hydraulic cylinder is being biased, fluid pressure will be supplied to the bearing surface at a plurality of equally spaced positions about the circumference. This permits power to be applied to the piston in either direction while the work holder is rotated. Thus, the piston may urge an operating tube of a machine tool rearward to close a chuck or draw collet, or may urge the operating tube forward to close a pushout type collet. In either case, an essentially uniform supporting pressure is provided and, hence, uniform spacing will be maintained, between the cylinder and bearing surface of the distributor wall about the entire circumference. This is particularly important where the rotational speed of the machine tool is very high.

Formed within the bearing wall itself is a pair of annular grooves, one groove adjacent each end of the distributor, for collecting fluid introduced to the cavities and escaping along the bearing wall. On the cylinder wall opposite each of these collecting grooves is a plurality of small annular grooves extending around the wall. These grooves hinder the axial flow of lubricant escaping from between the cylinder and the distributor. Thus, the lubricant must fill the small grooves before it can escape beyond either end of the bearing. However, once it fills the grooves, sufficient mass is accumulated that centrifugal force due to the rotation of the cylinder throws the accumulated lubricant into the oppositely disposed collecting groove. In this manner, an effective open seal is provided.

By virtue of the novel and improved construction of the hydraulic cylinder and associated distributor wall, the diameter of the distributor through which fluid is supplied to the piston is no greater and in many instances is less than the diameter of the piston chamber wall of the hydraulic cylinder. Thus, with the arrangement of the present invention, the piston size may be maximized for any given available space, without making allowances for the distributor structure or a surrounding housing.

Other attendant advantages of this invention will be readily appreciated as the same become better understood by reference to the following detailed description when considered in connection with the accompanying drawings in which.

Figure 1:
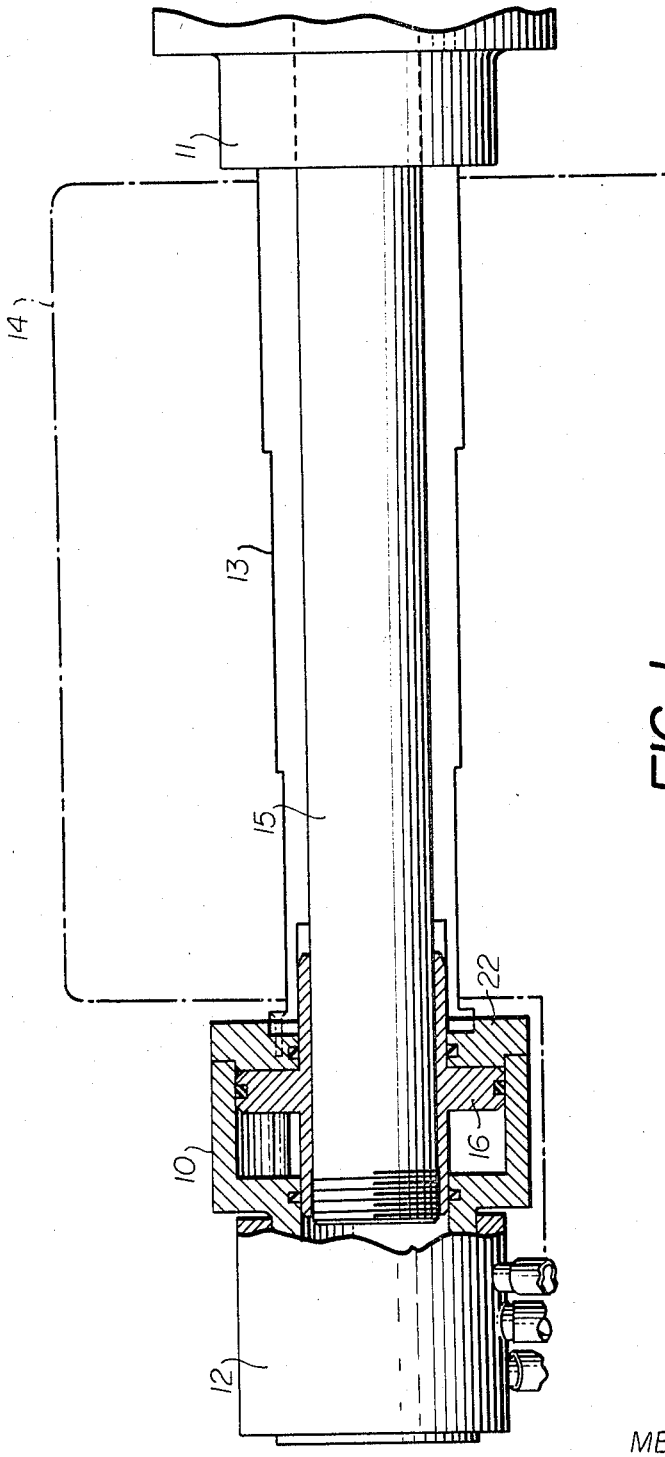
FIGURE 1 is an elevation view, partly in section, diagrammatically showing the relationship of a rotary spindle of a machine tool, a work holder and the rotary hydraulic cylinder of the present invention.

Referring now to the drawings, there is shown a rotary hydraulic cylinder 10 and a stationary oil supply distributor 12 surrounding a portion of the cylinder. The cylinder 10 is mounted on a spindle 13 of machine tool 14 with the axis of rotation of the cylinder 10 in a horizontal plane coinciding with that of the spindle. Within the cylinder 10, mounted for axial movement, is an annular piston 16. The annular piston 16 is rotatable with and axially movable relative to the rotating hydraulic cylinder 10. The rotary hydraulic cylinder 10 is adapted to rotate with the spindle 13 and a work holding device 11 of the machine tool 14. Such a work holding device may be a conventional chuck or collect type work holder. An actuating tube 15 is carried within the spindle 13 and is attached to the annular piston 16. Axial movement of the piston 16 and the attached tube 15 actuates the work holding device in a manner well known in the art.

With more particular reference now to rotary hydraulic cylinder 10, there is provided a cylinder wall 18 having three portions, 18a, 18b and 18c. The wall portion 18a is of smaller diameter than wall portion 18b, and the two are connected by annular wall portion 18c. Wall portion 18a is housed for rotation within the distributor 12. Wall portion 18b, external to the distributor 12, provides a cylinder wall for the piston 16 and, together with annular wall portion 18c and an annular cylinder cover 22, defines a chamber 19 for piston 16. The cover 22 is fastened to the larger diameter end of cylinder wall 18 by machine screws 23. A packing ring 24 in the cylinder cover 22 provides a fluid-tight seal between the cylinder cover 22 and the cylinder wall 18b. The distributor 12 is retained by a ring 70 fastened to cylinder wall 18 through cap screws 71.

Within the wall 18a of the rotary cylinder 10 are axially extending conduits or passageways 25 opening into annular wall portion 18c, in direct communication with piston chamber 19. The conduits 25 communicate with the external surface of cylinder wall 18a through apertures 26.

Axially extending conduits or passageways 28 are also provided in the cylinder wall 18, peripherally spaced between conduits 25. The conduits 28 extend through wall portions 18a, 18c, and 18b, and open through wall 18b into piston chamber 19 adjacent the cylinder cover 22. Conduits 28 communicate with the external surface of cylinder wall 18a through apertures 29. The apertures 26 and 29 are spaced from each other axially as well as peripherally on cylindrical wall 18a.

Figure 2:
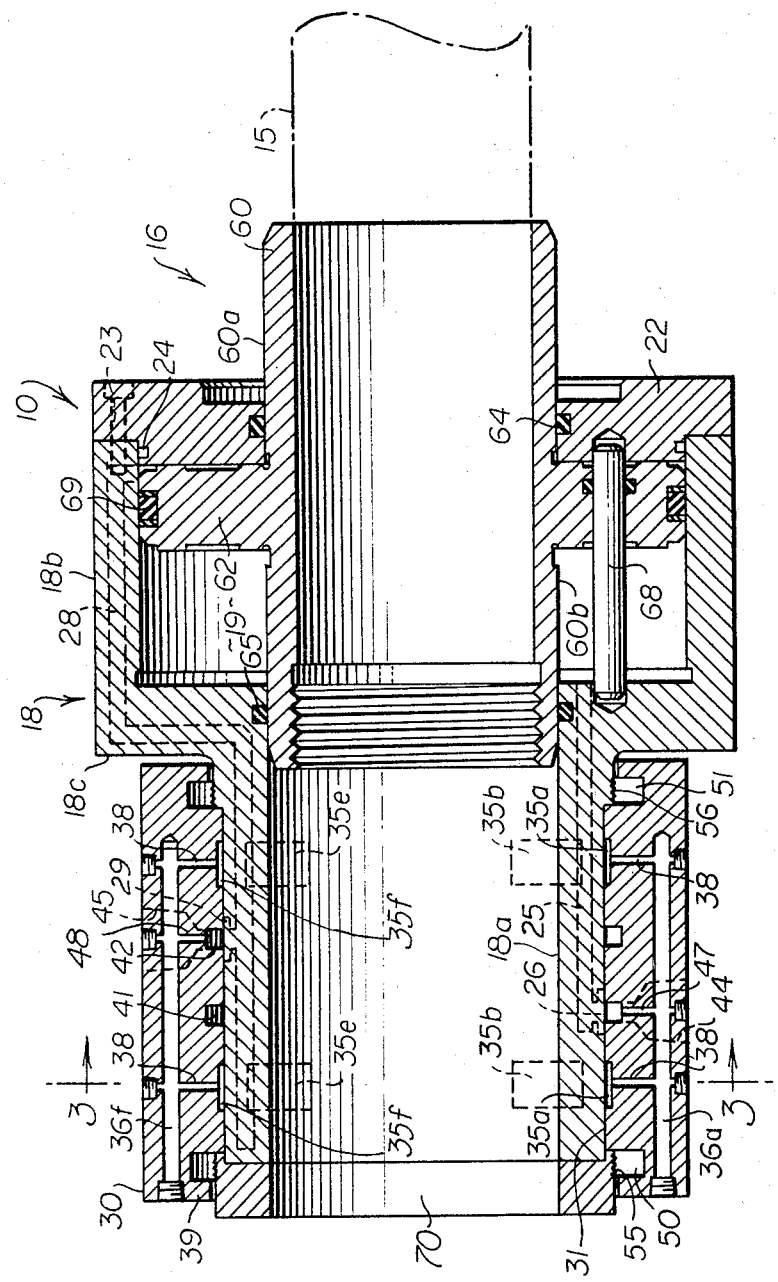
FIGURE 2 is a sectional view of a bearing and rotary cylinder constructed in accordance with the present invention, taken along the lines 2—2 of FIGURE 3, and looking in the direction of the arrows.

More particular reference is now made to the distributor 12. In the preferred embodiment, this distributor 12 is supported by a pressure lubricated bearing surface 31 and, as best shown in FIGURE 2, surrounds the small diameter portion 18a of cylinder 10. The inner, or bearing, surface 31 of distributor wall 30 includes two axially spaced groups of six circumferentially spaced shallow cavities 35. The cavities 35 of each circumferential group are aligned with each other axially of cylinder 10 on the distributor wall 30 in sets 35a, b, c, d, e, f.

Six conduits 36a, b, c, d, e, f extend axially within the distributor wall 30, each in peripheral and axial alignment with one set of two cavities 35a, b, c, d, e, f. A radial capillary 38 extends from a central portion of each cavity 35 to the respective, aligned, axial conduit 36.

Figure 3:
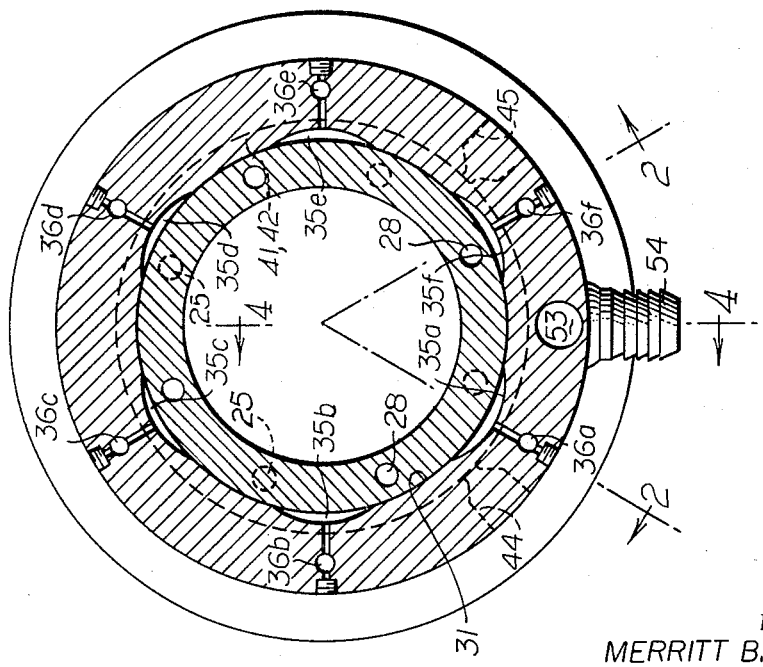
FIGURE 3 is a transverse section of the distributor and rotary cylinder of FIGURE 2 taken along the lines 3—3 of FIGURE 2, looking in the direction of the arrows.

As best shown in FIGURE 3, the peripherally spaced set of cavities 35 are located so that no cavity is along the lowest portion of distributor wall 30. Rather, the two lowermost situated sets of cavities 35a and 35f are equally spaced on either side of the lowest portion of the bearing wall 30. In this preferred embodiment, these cavities are situated approximately 30 degrees on either side of the lowest portion of the distributor wall.

Machined into the inner, or bearing, surface of distributor wall 30, are two axially spaced, annular grooves 41 and 42. A port 44 communicates through the distributor wall 30 to groove 41. A second port 45, peripherally spaced about distributor wall 30 from port 44 communicates through the distributor wall 30 to groove 42. One of the ports 44 and 45 may be connected, by a suitable valve arrangement in the oil supply system (not shown), to a supply of hydraulic fluid under pressure while the other port is connected to exhaust. Radial passageways 47 extend between each alternate axial conduit 36a, c, e and annular groove 41, and radial passageways 48 extend between the remaining axial conduits 36b, d, f and annular groove 42. Thus, at any one time, three alternate sets of cavities 35 spaced peripherally about the bearing surface of distributor wall 30 are connected with a source of hydraulic fluid under pressure, through passageways 47 or 48, condits 36, and capillaries 38, while the remaining alternately spaced sets of cavities 35 are similarly connected to exhaust. Grooves 41 and 42 are axially aligned with apertures 26 and 29, respectively, of cylinder wall 18a. Thus, at any one time, one end of piston chamber 19 is connected to a source of hydraulic fluid under pressure while the other end is connected to exhaust, via the grooves 41 and 42 and the conduits 25 and 28. All the radial passageways 38 are small in diameter and essentially capillary-like, and serve to substantially reduce and control the pressure and flow of the oil flowing from the groove 41 or 42 to the cavities 35. This permits the use of a common pressure source of oil for the bearing and the operating cylinder.

Figure 4:
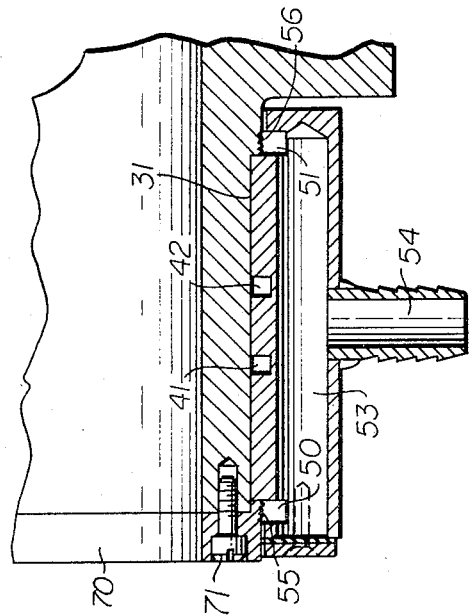
FIGURE 4 is a partial transverse section of the distributor and rotary cylinder, taken along the lines 4—4 of FIGURE 3, looking in the direction of the arrows, and showing details of a drain conduit for the distributor.

Adjacent the ends of the cylindrical distributor wall 30, and recessed from the bearing surface, are annular collecting grooves 50 and 51. As best shown in FIGURE 4, each collecting groove 50 and 51 communicates at the lowest portion of the bearing wall 30 with an axially extending drain conduit 53. A drain outlet 54 extends downward from conduit 53 to provide for the escape of hydraulic fluid. A plurality of annular grooves 55 and 56 are formed in the outer surface of the cylinder wall 18a and the ring 70, opposite collecting grooves 50 and 51, respectively. These grooves collect hydraulic fluid as it flows out from between the distributor wall 30 and the cylinder, and the fluid is then thrown by centrifugal force into grooves 50 and 51.

Referring now specifically to the piston 16, there is provided a central, cylindrical body 60 extending axially of cylinder 10 and located centrally therein. The cylindrical body 60 is divided into a front portion 60a and a rear portion 60b by an annular flange 62.

The front wall portion 60a of cylindrical body 60 extends through cylinder cover 22. A packing, such as an O-ring 64, provides a fluid-tight, sliding seal between tubular wall 60a and cylinder cover 22. The rear wall portion 60b of piston 16 extends into the portion of cylinder 10 having a reduced diameter, as defined by the cylinder wall 18a. A packing, such as an O-ring 65, provides a sliding, fluid-tight seal between the rear portion 60b of piston 16 and the inner surface of cylinder wall 18a. Hence, the central cylindrical body 60 of piston 16 cooperates with wall 18a of cylinder 10 and with cylindrical cover 22 to form an annular piston chamber 19. A pin 68, extending axially between cylinder wall 18c and cover 22 through piston flange 62 allows axial movement of the piston 16 while restraining rotary motion, relative to cylinder 10. A packing, such as an O-ring 69, is provided between the peripheral wall of piston flange 62 and the cylinder wall 18b to provide a fluid-tight, sliding, seal.

In operation, and by way of example, the piston 16, when in the position shown in FIGURE 2, opens the work holder to accept or release a work piece. When the piston 16 is moved in the opposite direction, toward cylinder wall 18c, the jaws or collet of the work holder 11 are closed to hold a work piece. The piston remains biased in this position by fluid pressure to hold the work piece as the spindle 13, work holder 11 and cylinder 10 are rotated.

Hydraulic fluid, such as oil, is introduced by way of a suitable valve arrangement through port 45 of distributor 12. At the same time, port 44 of distributor 12 is connected to exhaust. The oil entering port 45 is introduced directly into the annular groove 42 in the inside surface of distributor wall 30. Annular groove 42 communicates with axial conduits 28 through apertures 29 in the outer surface of cylinder wall 18a and also with axial conduits 36b, d, f adjacent alternate sets of cavities 35b, d, f through separate radial passageways 48 in distributor wall 30. The oil flows under pressure through axial conduits 28 to piston chamber 19 and acts on annular flange 62 of piston 16 to move and then bias piston 16 toward cylinder wall 18c (i.e., in work holding position). The oil introduced under pressure to axial conduits 36b, d, f flows to the associated sets of cavities through associated radial passageways 38 to provide spaced pressure support zones for the stationary distributor 12. As the piston 16 moves toward work holding position, oil is exhausted from piston chamber 19 through axial conduits 25, apertures 26 in the surface of cylinder wall 18a, and then into annular groove 41 in distributor wall 30, and out port 44. At the same time, pressure in the cavity sets 35a, c, e is lost because these cavities communicate with axial conduits 36a, c, e that are now connected to exhaust port 44 through radial passageways 47. Thus, during rotation of the cylinder 10 and the work piece, fluid support between the cylinder 10 and the distributor 12 is provided by the three sets of fluid pressure zones 35b, d, f.

Upon completion of a machining operation, the rotation of cylinder 10 is stopped, port 45 is connected to exhaust and port 44 is connected to oil under pressure, and the flow of oil in the system is reversed. Piston 16 is shifted axially toward cylinder cover 22, thereby releasing the work piece. At the same time, fluid pressure is supplied to the bearing surface of the distributor wall 30 through sets of cavities 35a, c, e to provide spaced zones of fluid pressure support between the cylinder 10 and the distributor 12.

The oil supplied to the bearing surface through cavities 35 escapes at a controlled rate of flow that is a function of the pressure drop through passageways 38, the clearance between the bearing wall of distributor 12 and the cylinder wall 18a, the viscosity of the oil, and the temperature and material of the bearing. In normal operation, the cylinder is rotated between 100 to 1500 revolutions per minute. A clearance between the bearing and the cylinder of 0.002 inch is provided and the temperature of the bearing is maximized at about 200 degrees Fahrenheit. Standard hydraulic oil is supplied at a pressure of between 200 to 500 pounds per square inch gauge, and a flow rate of oil between the bearing and cylinder wall is established of between one-half to one and one-half gallons per minute. This flow assures overall lubrication of the bearings and is collected in annular collecting grooves 50 and 51 at either end of the distributor wall 30 and drained through conduit 53 and drain outlet 54.

The actual size of the passageways 38 for obtaining the desired pressure drop to control the oil flow in the bearing will vary with the other parameters involved, particularly with the bearing clearance and the oil pressure. The clearance, of course, increases with temperature to an extent dependent upon the material of which the parts are made. However, the primary desideratum is that the rate of flow of oil from the bearing preferably be no more than 2 gallons per minute and in all events be no greater than 5 gallons per minute, and a satisfactory pressure drop may be readily established to so control the flow. The specific manner in which the various parameters involved are interrelated is disclosed in more detail in the book "Design of Hydrostatic Bearings," part 9, by H. C. Rippel. Reference may also be had to the published article "Single and Multiple-Pad Journal Bearings," Machine Design, Nov. 21, 1963, pages 199 et seq.

Because the fluid supplied to piston chamber 19 for actuating piston 16 into work holding position is supplied from conduits common to the spaced sets of fluid pressure zones, the pressure in the supporting fluid pressure zones will be proportional to the pressure exerted upon piston 16. This assures adequate fluid support between the rotating cylinder and the bearing wall. Furthermore, the location of the pressure support zones about the bearing wall assures that the pressure will be supplied uniformly about the bearing and rotating cylinder.

The oil collecting grooves at each end of the bearing wall catch the oil flowing from the cavities 35 along the bearing. Because these grooves, along with the fluid supply conduits, are located within the bearing wall of the distributor itself, the need for a separate housing surrounding the distributor is obviated. By locating the distributor axially spaced from the piston chamber and about a portion of the cylinder of reduced diameter, the distributor need not be of larger diameter than the piston chamber. Thus, the diameter of the piston may be maximized for the available space or clearance afforded by the construction of the machine tool; and the distributor, by not requiring a surrounding housing to supply and/or collect the flow of support fluid, requires no additional clearance, with respect to the machine tool, over that of the piston chamber. Furthermore, with this construction, the substantial space normally taken by rotating bearings between the cylinder and a stationary housing is saved and, of course, there are no bearings to wear.

While in the foregoing disclosure a preferred embodiment of the invention has been disclosed, numerous modifications or alterations may be made therein without departing from the spirit or scope of the invention as set forth in the appended claims.

What is claimed is:

1. In a machine tool: a horizontal rotary spindle supported in said machine tool and having two extending ends; a rotary work holder fixed to one end of the spindle; a rotary hydraulic cylinder fixed to the other end of the spindle; a distributor surrounding a portion of the cylinder; a piston chamber within said cylinder; a double acting, movable, piston within said chamber having two opposed annular surfaces, said piston being rotatable with and axially movable within the cylinder; an actuator tube having two ends and extending through the spindle, one end fastened to the piston and the other end actuating the work holder; a cylindrical bearing surface on the distributor surrounding a portion of said cylinder; a pair of spaced annular grooves in said bearing surface; a plurality of spaced cavities in the bearing surface, said cavities being peripherally spaced about the cylindrical bearing surface; a plurality of conduits in said distributor, each communicating between a cavity and one of said pair of spaced annular grooves; and at least two axial passageways in the portion of the cylinder wall surrounded by the bearing surface, a first of said passageways communicating between one of said spaced annular grooves and one end of the piston chamber and a second of said passageways communicating between the other of said spaced annular grooves and the other end of the piston chamber.

2. In a machine tool having a horizontal, rotary, hydraulic cylinder for actuating a work holder of a machine tool, the combination of
 (a) a piston chamber in the cylinder,
 (b) a piston in the chamber of the cylinder, rotatable therewith, and axially movable from one end of the chamber to an opposite end,
 (c) a distributor surrounding a portion of said cylinder and having a bearing surface by which it is supported around said cylinder,
 (d) at least two axially spaced groups of at least six circumferentially spaced cavities in the bearing surface of the distributor, the cavities of the groups being axially aligned with each other in sets,
 (e) one axially extending conduit along the distributor for each set of axially aligned cavities and communicating with the cavities of each set,
 (f) a first annular groove in the bearing surface communicating with only alternate ones of said axially extending conduits about the bearing,
 (g) a second annular groove in the bearing surface communicating with the remaining ones of said axially extending conduits,
 (h) a first axial passageway in the wall of the portion of cylinder surrounded by the distributor, communicating between said first annular groove and one end of the piston chamber,
 (i) a second axial passageway in the wall of the portion of the cylinder surrounded by the distributor, communicating between said second annular groove and an opposite end of the piston chamber, and
 (j) means to introduce fluid under pressure to one of said annular grooves to bias the piston toward one end of the chamber and to supply fluid under proportionate pressure to alternate sets of cavities.

3. The combination of claim 2 including two additional spaced annular grooves in the bearing surface, one adjacent each end of the distributor for collecting fluid that flows from the cavities.

4. The combination of claim 3 including an axial bore in the distributor connecting the two additional spaced annular grooves adjacent the ends of the distributor for draining the fluid collected.

5. The combination of claim 2 wherein the sets of cavities are equally spaced from each other circumferentially about the bearing surface and are circumferentially spaced from the lowest portion of the bearing surface.

6. In a rotary work holder actuator, the combination of a rotary cylinder; an axially movable piston within the cylinder; a stationary distributor surrounding a portion of said cylinder; means, including spaced cavities in said distributor for introducing fluid under pressure between the distributor and the surrounded cylinder at spaced locations about the distributor, to provide fluid support therefor; and communicating conduits within the distributor and the cylinder to allow proportionate fluid pressure to be applied to the piston and to spaced cavities of the distributor.

7. The apparatus of claim 6 including means within the distributor for collecting fluid that escapes from said cavities.

8. The apparatus of claim 6 wherein the rotary cylinder and distributor are horizontally disposed and wherein the means for providing fluid support are located about the distributor at positions spaced from the lowest portion of the distributor.

9. The apparatus of claim 6 wherein the distributor includes two spaced annular grooves, one groove adjacent each end of the distributor, constructed and arranged to collect fluid that flows axially of the distributor in between the distributor and the cylinder.

10. The apparaus of claim 9 wherein an axially extending conduit is located at the lowest portion of the distributor and communicates between the two spaced annular grooves.

11. The apparatus of claim 10 wherein the axially extending conduit has a drain.

12. The apparatus of claim 9 wherein a plurality of annular grooves are formed in the outer surface of the small diameter portion of the cylinder opposite the two spaced annular grooves of the distributor.

13. In a rotary work holder actuator, the combination of a rotary cylinder; an axially movable piston within the cylinder; a fluid distributor surrounding a portion of said cylinder, said distributor having a bearing surface adjacent the cylinder; spaced cavities in the bearing surface; means, including conduits and passageways within the distributor for introducing fluid under pressure from a common source to the cylinder and also to the cavities, said means being so constructed and arranged to substantially reduce the pressure of the fluid introduced to the cavities and thereby limit the flow of the fluid to the bearing to a rate of between one and five gallons per minute.

14. An actuator for a work holder of a machine tool adapted to be supported on a rotary spindle of the machine tool and connected to a rotary work holder carried by the spindle, said actuator including a rotary member with an external cylindrical surface and a stationary fluid distributing member surrounding the cylindrical surface; a piston chamber within said actuator; a double acting, movable, piston within said chamber constructed to be connected to a work holder actuating member, said piston having two opposed surfaces and being rotatable with and axially movable within the actuator; a cylindrical bearing surface on the distributing member surrounding the cylindrical surface of the rotary member; two spaced annular grooves in one of said bearing surface and surrounded cylindrical surface of the rotary member; a plurality of spaced cavities in the bearing surface, said cavities being peripherally spaced about the cylindrical bearing surface; a plurality of conduits in said distributing member, each communcating with a cavity and one of said spaced annular grooves; and at least two axial passageways in the portion of the rotary member surrounded by the bearing surface, a first of said passageways communicating between one of said spaced annular grooves and one end of the piston chamber and a second of said passageways communicating between the other of said spaced annular grooves and the other end of the piston chamber.

15. In a rotary hydraulic actuator for actuating a rotary work holder on a spindle of a machine tool and adapted to be supported by the spindle and connected to the work holder, a rotary member having a cylindrical portion, a piston chamber and a double acting, movable, piston within said chamber constructed to be connected to a work holder actuating member, said piston having two opposed surfaces and being rotatable with and axially movable within the rotary member; a stationary fluid distributing member having a cylindrical bearing surface surrounding the cylindrical portion of said rotary member; a pair of spaced annular supply grooves in one of said distributor surface and surrounded cylindrical portion of the rotary member; fluid inlet and exhaust ports in the distributing member communicating with said grooves, at least two axial passageways in the portion of the rotary member surrounded by the bearing surface, a first of said passageways communicating between one of said spaced annular grooves and one end of the piston chamber and a second of said passageways communicating between the other of said spaced annular grooves and the other end of the piston chamber; and means connected to the distributing member to supply and exhaust fluid to and from said annular grooves; the improvement which comprises a plurality of spaced cavities in said bearing surface, said cavities being peripherally spaced about the bearing surface and arranged in two axially spaced groups, one group located on an opposite side of the said pair of spaced annular supply grooves from the other group; means, including conduits communicating between cavities, to supply fluid under pressure to said cavities through said conduits; restrictive portions forming a part of said conduits to reduce the pressure of fluid supplied to the cavities through said conduits prior to introduction of the fluid to the cavities; and annular fluid collecting grooves in one of said distributing member and surrounded cylindrical portion of the rotary member, spaced axially outwardly of said cavities, to collect fluid that flows axially of the distributor between the distributor and the said surrounded cylindrical portion of the actuator.

16. The apparatus as set forth in claim 15 wherein the said annular fluid collecting grooves are in the distributing member and the surrounded cylindrical portion of the rotary member includes a plurality of grooves narrow with respect to the annular collection grooves and disposed opposite the said collection grooves to accumulate fluid to be thrown into the collection grooves by centrifugal force.

17. In a rotary work holder actuator for a machine tool: a rotary cylinder for attachment to a machine tool spindle; a piston chamber within the cylinder; a fluid operated reciprocable piston within the piston chamber of the rotary cylinder for actuating a work holder carried by the spindle; a fixed fluid distributor about a portion of the cylinder, said distributor including a fluid inlet and a fluid outlet, a bearing surface, means including conduits for supplying fluid from the fluid inlet to the bearing surface and to the piston chamber, a pair of annular grooves, one groove of said pair disposed adjacent each opposite end of the distributor for receiving fluid flowing axially between the rotary cylinder and the distributor, and a plurality of narrower and shallower annular grooves in an outer surface of the cylinder disposed opposite each groove of the said pair of annular grooves for accumulating fluid to be thrown by centrifugal force into each groove of the said pair of annular grooves of the distributor.

References Cited

UNITED STATES PATENTS

| 1,827,409 | 10/1931 | Waring | 308—36.4 |
| 1,905,234 | 4/1933 | Labberton | 308—36.4 |
| 2,812,186 | 11/1957 | Carlsen | 279—4 |

FOREIGN PATENTS

| 639,293 | 6/1950 | Great Britain. |
| 825,763 | 12/1959 | Great Britain. |

ROBERT C. RIORDON, *Primary Examiner.*

J. C. PETERS, *Assistant Examiner.*

U.S. Cl. X.R.

92—106; 308—36.4